United States Patent [19]

Graindorge et al.

[11] Patent Number: 4,705,399
[45] Date of Patent: Nov. 10, 1987

[54] DEVICE FOR MEASURING A NONRECIPROCAL PHASE SHIFT PRODUCED IN A CLOSED-LOOP INTERFEROMETER

[75] Inventors: Philippe Graindorge, Magny les Hameaux; Hervé Arditty, Marly Le Roi; Hervé Lefevre, Paris, all of France

[73] Assignee: Thomson-CSF, Paris, France

[21] Appl. No.: 21,574

[22] Filed: Mar. 3, 1987

Related U.S. Application Data

[63] Continuation of Ser. No. 743,674, Jun. 11, 1985, abandoned.

[30] Foreign Application Priority Data

Jun. 14, 1984 [FR] France .................. 84 09311

[51] Int. Cl.$^4$ .................. G01B 9/02; G01C 19/64
[52] U.S. Cl. .................. 356/350
[58] Field of Search .................. 356/350

[56] References Cited

FOREIGN PATENT DOCUMENTS

0030891 6/1981 European Pat. Off. .
2443668 7/1980 France .

Primary Examiner—Vincent P. McGraw
Attorney, Agent, or Firm—Oblon, Fisher, Spivak, McClelland & Maier

[57] ABSTRACT

The device for measuring a nonreciprocal phase shift involves phase modulation of countercirculating waves in a closed-loop interferometer by means of a reciprocal-effect phase modulator. The modulating signal is a periodic signal having a period $2t_o$, where $t_o$ is the transit time of an electromagnetic wave in the closed loop. A digital phase ramp generated in the form of a stairstep signal is combined with the phase-modulating signals and applied as feedback. In an additional embodiment, control circuits are provided for correcting the modulation scale factor.

5 Claims, 14 Drawing Figures

FIG_1

FIG_2

FIG_3

FIG_4

FIG_6

FIG_7

FIG_5

FIG_9

FIG_10

FIG_11

FIG_12

FIG_13

FIG_14

DEVICE FOR MEASURING A NONRECIPROCAL PHASE SHIFT PRODUCED IN A CLOSED-LOOP INTERFEROMETER

This application is a continuation of application Ser. No. 743,674, filed on June 11, 1985, now abandoned.

BACKGROUND OF THE INVENTION

1. Field of the Invention

The present invention relates to a device for measuring a nonreciprocal phase shift in a closed-loop optical interferometer which is also known as a Sagnac interferometer.

2. Description of the Prior Art

An interferometer of this type mainly comprises a source of light energy usually provided by a laser, an optical device forming a waveguide and constituted either by a predetermined number of mirrors or by a multiturn optical fiber coil, a light-beam splitting and mixing device, and a device for detecting and processing the detected signal.

In interferometers of this type, it is known that there are two waves which emerge from the beam-splitter and travel along the same optical path in opposite directions.

A basic property of closed-loop interferometers is reciprocity. This property can be expressed as follows: any disturbance of the optical path affects the two waves in a similar manner in spite of the fact that these two waves are subjected to the disturbance neither exactly at the same instant nor in the same direction.

There are, however, two types of disturbances which affect reciprocity.

One type consists of disturbances which vary with time, namely over a period comparable to the time taken by the waves to propagate along the optical path of the interferometer. The other type consists of the so-called "nonreciprocal" disturbances or, in other words, disturbances which produce a different effect on the waves according as they propagate in one direction or in another along the optical path. These are in fact physical effects which destroy the symmetry of the medium in which the waves propagate.

Two known effects are subject to this second type of disturbance:

the Faraday effect, or colinear magnetooptical effect, in which a magnetic field produces a preferential orientation of electron spin of an optical material;

the Sagnac effect, or relativistic inertial effect, in which rotation of the interferometer with respect to a Galilean reference frame destroys the symmetry of the propagation time. This effect is advantageously employed in particular in the design and construction of gyrometers, usually known as rate gyros.

When "nonreciprocal" disturbances are not present, there is accordingly a zero phase difference (said difference being hereinafter designated as $\Delta\phi$) between the two waves which recombine in the light-beam splitting and mixing device after having traveled along the optical path. The detecting and processing device detects signals representing the optical power of the composite wave obtained after recombination. In interferometers of the prior art, the optical power just mentioned can be resolved into two components, namely a constant component and a component which is proportional to cos ($\Delta\phi$) and exists only at the time of appearance of "nonreciprocal" disturbances.

Should it be desired to measure low-amplitude disturbances such as, for example, low rotational or spin velocities in the case of rate gyros, the component which contains the term of the form cos ($\Delta\phi$) varies only to a slight extent since the phase shift $\Delta\phi$ is close to zero.

It is accordingly necessary to introduce artificially a fixed additional phase shift or "non-reciprocal bias" for the purpose of increasing the sensitivity of measurement. In a particularly advantageous case, the new measured phase shift $\Delta\phi'$ is such that $\Delta\phi' = \Delta\phi + \pi/2$.

In this case, maximum sensitivity is achieved since the term to be measured is proportional to cos ($\Delta\phi + \pi/2$), that is, to sin ($\Delta\phi$).

Although this method is attractive, practical difficulties have been encountered, especially in regard to the possibility of providing a device for introducing a nonreciprocal bias which is sufficiently stable to be suitable for use. The instability of these devices is usually of the same order of magnitude as the variations in the quantity to be measured.

In order to overcome these disadvantages, French patent No. FR-B-2,471,583 has consequently proposed a phase modulation of the waves which propagate within the closed loop, alternately of $+\pi/2$ and $-\pi/2$ radians.

This method is based on the property of the Sagnac interferometer which consists in producing the equivalent of a discrete temporal drift.

In fact, since a phase modulation is produced at one end of the fiber loop, one of the waves undergoes modulation at the moment of generation of the wave whereas the other wave experiences modulation with a time-delay equal to the time of propagation within the fiber. This propagation time satisfies the relation $$t_o = \frac{nl}{c},$$

where n is the refractive index of silica, l is the length of the fiber and C is the velocity of light in a vacuum. The "natural frequency" of the interferometer is ($\frac{1}{2} t_o$) and represents the modulation frequency at which the two waves undergo two phase shifts in phase opposition. The phase shift between the two optical waves is therefore equal to the difference $S(t) - S(t - t_o)$, where $S(t)$ is the signal applied to the phase modulator. It is therefore apparent that, if the half-period of the modulating signal is $t_o$, the phase shift at the exit of the interferometer is equal to twice the value of the applied phase shift. This is the method employed for producing the bias which serves to establish the operating point of the interferometer.

To this phase shift is added a phase shift $\Delta\phi_o$ which arises from the nonreciprocal effect, namely from rotation if this latter is not zero.

It is possible to utilize the signals directly and to measure the component in cos ($\Delta\phi + \pi/2$).

A more accurate method which guards against errors arising from possible drift of the different elements employed such as the optoelectronic elements, for example, consists of an indirect or "zero method". In accordance with this method, the above-mentioned phase-shift difference with respect to $\pm\pi/2$ radians is compared by generating an additional phase shift which is equal at absolute value to the amplitude of the phase shift produced by the nonreciprocal effect of contrary sign in order to reduce it to zero.

In order to achieve this result, it is not possible in actual practice to utilize the same physical phenomenon which produces the nonreciprocal effect or in other words to modify the rotation.

Recourse is had to electrical means for generating a negative-feedback signal. This choice is based on the assumption that these electrical means can be controlled more effectively than the other elements of the interferometer, as has in fact been shown by practical experience.

The object of this negative feedback is to produce between the two waves a phase shift which is continuously equal and of opposite sign with respect to the phase shift induced by the rotational velocity. If the velocity is constant and produces a phase shift $\Delta\phi$, it is therefore necessary to ensure that, between two separate instants of t, the instantaneous value of the phase modulation has varied by $(\Delta\phi_o + 2\pi n)$ radians, where n is a whole number. This is therefore the equivalent of an integral of the velocity. One method of operation consists in generating a so-called "phase ramp" having a slope which is proportional to $(\Delta\phi_o/t_o)$.

However, this method presupposes two distinct operations: phase modulation and generation of a negative-feedback signal. Furthermore, the proportionality factor or scale factor is unrelated to that employed for the modulation of $\pm(\pi/2)$ radians.

Furthermore, the aforementioned phase ramp cannot be infinite. In other words, the signal which is constituted in practice by a phase modulator control voltage cannot increase above a predetermined threshold value.

In consequence, a feasible method consists in generating sawtooth phase-shift control signals having a peak-to-peak amplitude of $2\pi$ radians, the mathematical functions involved being periodic and having a period of $2\pi$ radians. There then follows the problem of accurately determining said phase-shift amplitude equal to $2\pi$ radians.

The objective set by the present invention is to overcome the difficulties which have been mentioned in the foregoing. To this end, the so-called phase ramp consists of a digital signal. The phase modulation, also in digital form, and said phase ramp are combined in a single signal and converted to an analog signal for controlling a phase modulator placed within the interferometer loop.

Apart from the simplification which is achieved as a result of this arrangement, the relationship between scale factors and the problem of relaxation of $2\pi$ radians are thus solved both simply and simultaneously.

SUMMARY OF THE INVENTION

An interferometric device for measuring a non-reciprocal phase shift experienced by two light waves circulating in opposite directions within a closed-loop waveguide, said device comprising a monochromatic light source, photodetecting means for detecting the interference of said two waves and delivering an output electric signal which is representative of the light intensity of the detected interference and optical beam-splitting and mixing means for optically coupling the ends of said waveguide to said light source and to said photodetecting means, electrically controlled optical phase-shifting means placed within the closed loop which produces action on said waves, an oscillator for delivering periodic electric signals in the form of square-wave pulses having a frequency $f_o = \frac{1}{2} t_o$, where $t_o$ is the time taken by each wave to travel along the optical path defined by the closed loop, synchronous detection circuits for receiving the output signal of the photodetector on a first input and a detection synchronization signal derived from said electric signals of frequency $f_o$ on a second input, an analog-to-digital converter which is connected to the output of the synchronous detection circuits and converts the electric signals derived from the synchronous detection to a signed binary word of predetermined length, circuits for generating a composite digital control signal and a digital-to-analog converter for converting said composite digital control signal to an analog control signal which is transmitted to a control input of said optical phase-shift means, and means for control and synchronization of the synchronous detection circuits, of the analog-to-digital converter, of the circuits for generating the composite digital control signal and of the digital-to-analog converter, the function of said circuits for generating said composite digital control signal being to produce a signal derived from the superposition of a first square-wave periodic signal at said frequency $f_o$, such that after digital-to-analog conversion, said first signal imparts a periodic reciprocal-effect phase shift alternately of $+\pi/2$ and $-\pi/2$ radians to said two waves which circulate in opposite directions in the closed loop, and of a second signal in stair-steps in which each stair-step has a duration equal to said time interval $t_o$ or to an odd integral multiple of said time interval and an amplitude such that, after analog-to-digital conversion, said second signal imparts additional reciprocal-effect incremental phase shifts having an amplitude proportional to the amplitude of said nonreciprocal phase shift and of opposite sign, the phase shift imparted by the second signal being such as to produce a relaxation having an amplitude of $2\pi$ radians, thereby ensuring that said superposition of the first and second signals forming the composite control signal imparts to the waves circulating in opposite directions within the closed loop total phase shifts between said two waves which vary alternately between $-\pi/2$ and $+\pi/2$ radians during the first periods and $-3\pi/2$ and $+3\pi/2$ radians during the second periods, said first and second periods being such as to occur successively in an overlapping sequence.

BRIEF DESCRIPTION OF THE DRAWINGS

Other features of the invention will be more apparent upon consideration of the following description and accompanying drawings, wherein.

COMPARATIVE STUDY OF THE PRIOR ART

It will first prove useful to recall the principal phenomena employed in a Sagnac closed-loop interferometer as well as the method of modulation taught by French patent No. FR-B-2,471,583 cited earlier.

Figure 1:
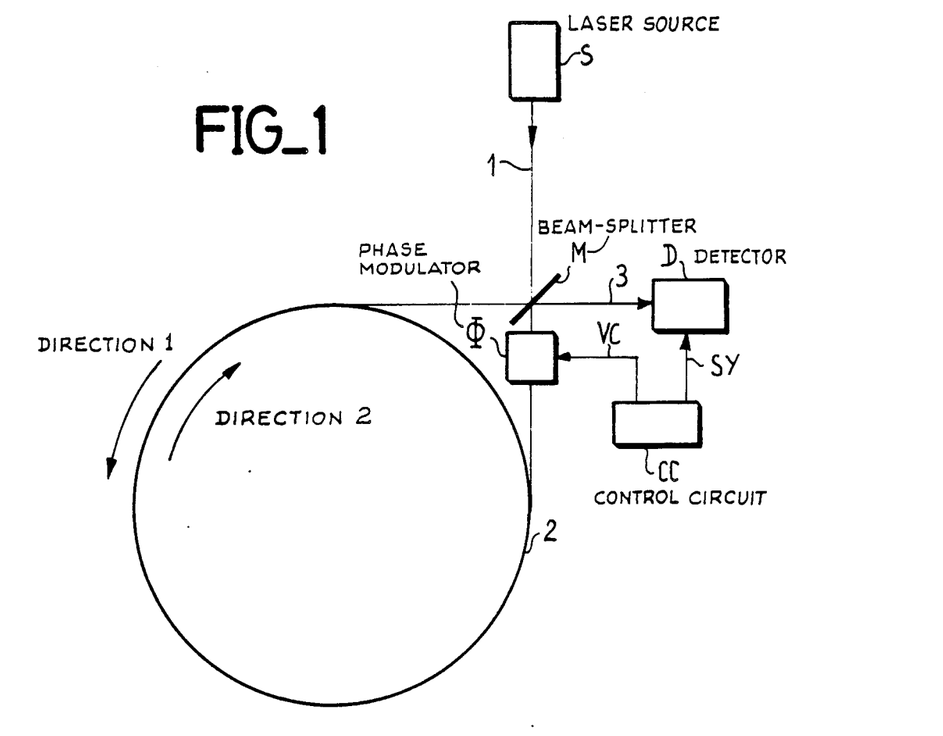
FIG. 1 is a closed-loop interferometer of the prior art.

FIG. 1 provides a schematic illustration of the constructional arrangement of a closed-loop interferometer of the type described in this patent.

A laser source S produces a beam 1 of parallel light rays which is incident on a beam-splitter consisting, for example, of a semi-transparent plate or mirror M which is optically coupled with the interferometer loop 2. Said loop 2 can consist, for example, of a single-mode optical fiber which forms a multiturn coil. Sensitivity of measurement is in fact enhanced by the use of an optical path of substantial length which is proportional to the number of turns. Said loop 2 is closed on the beam-splitter M which also performs the function of a mixing device and thus defines an exit branch 3. Two counter-propagating waves therefore travel around the loop in opposite directions: one wave in the clockwise direction ("direction 2") and the other wave in the anticlockwise direction ("direction 1"). These two waves recombine on the beam-splitter plate M. The result of this recombination can be observed in the exit branch 3 by means of the detector D.

Let $\Delta\phi_o$ be the phase difference between the two waves which propagate in opposite directions within the annular coil or closed loop. Let $P_S$ be the optical power output which can be measured in the exit branch 3. In the absence of any "nonreciprocal" disturbance, $\Delta\phi_o$ is zero.

By way of nonlimitative example, if consideration is given to a gyrometer or so-called rate gyro which makes use of a closed-loop interferometer, a nonreciprocal disturbance will be set up by imparting a spin to the gyro. The difference in phase is no longer zero and we have $\Delta\phi_o = \alpha\Omega$ where $\Omega$ is the spin or rotation velocity and $$\alpha = k\frac{L}{\lambda C}$$

where k is a constant which is dependent on the geometry of the rate gyro, L is the length of the optical path, $\lambda$ is the wavelength of the light emitted by the laser source S, and C is the velocity of light within the loop 2. When the rotational velocity $\Omega$ increases, the difference in phase $\Delta\phi_o$ increases in the same proportions since the coefficient $\alpha$ remains constant. The optical power $P_S$ varies progressively in accordance with a cosinusoidal law. In fact:

$$P_S = P_{1S} + P_{2S} + 2\sqrt{P_{1S}P_{2S}} \cos(\Delta\phi_o)$$

In this relation, the component $P_{1S}$ corresponds to "direction 1" and the component $P_{2S}$ corresponds to "direction 2". The sensitivity of measurement in respect of a given value $\Delta\phi$ is expressed by the derivative of $P_S$:

$$\frac{dP_S}{D(\Delta\phi)} = -2\sqrt{P_{1S}P_{2S}} \sin(\Delta\phi_o).$$

Figure 2:
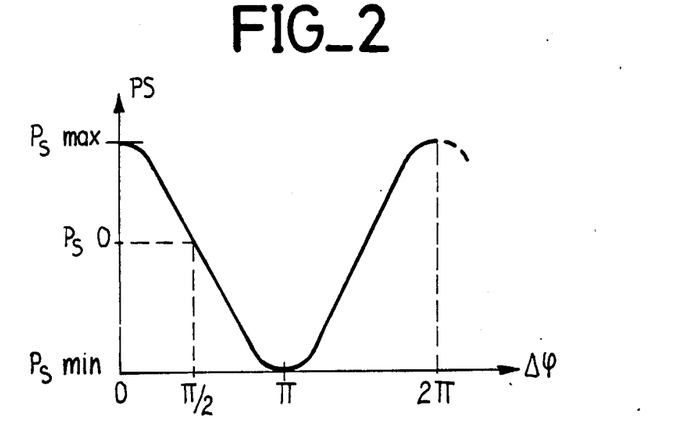
FIG. 2 is a diagram representing the variation in detected optical power as a function of the phase difference between the two waves which circulate within the fiber loop of the interferometer.

The sensitivity of the interferometer is very low if the phase difference $\Delta\phi$ is only slightly different from zero. This is the case in a rate gyro if it is desired to measure low rotational velocities $\Omega$. The variation in optical power in the exit branch as a function of the phase difference $\Delta\phi$ is illustrated by the diagram of FIG. 2.

The terms $P_{1S}$ and $P_{2S}$ can be considered as equal. It accordingly follows that, in the case of a phase difference of $\Delta\phi = \pi$ radians, the detected power is at a minimum value. It passes through a maximum value $P_{Smax}$ in respect of $\Delta\phi = 0$ and in respect of $2\pi$ radians and so on.

In order to increase the sensitivity of the interferometer, it is possible to introduce a constant nonreciprocal bias in the phase of the two countercirculating waves, thereby displacing the operating point of the interferometer.

In the case of a function which varies in accordance with a cosinusoidal law, the point having the highest sensitivity is obtained by the angles of $(2n+1)\pi/2$ radians, with n a whole number. It is therefore possible to choose a bias which introduces a phase variation in each wave at an absolute value of $\pi/4$ radians but of contrary signs. In the absence of a nonreciprocal disturbance, the phase difference accordingly becomes $\Delta\phi' = \Delta\phi_1 + \Delta\phi_o$ with $\Delta\phi_1 = \pm\pi/2$ radians, which then corresponds to the point $P_{So}$ of FIG. 2.

In accordance with the teachings of the French patent cited in the foregoing, a phase modulator which applies a reciprocal effect is introduced on the wave path in the interferometer loop 2. Said modulator $\Phi$ (FIG. 1) is excited so as to produce a variation in phase $\Phi(t)$ of the wave which passes through said modulator. Said variation is periodic and its period is equal to $2t_o$, where $t_o$ is the transit time of a wave within the loop.

The phase difference then becomes $$\Delta\phi' = \Delta\phi_o + \Phi(t) - \Phi(t-t_o)$$

where each countercirculating wave experiences this phase shift when it passes through the modulator with $$\Phi(t) = \Phi(t+2t_o)$$

Figure 3:
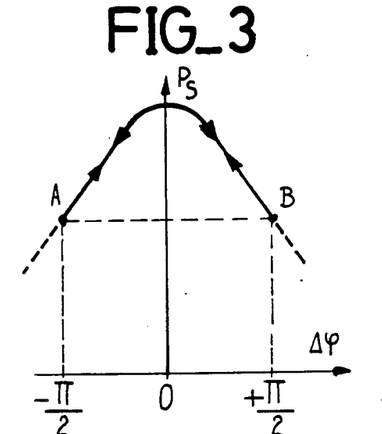
FIGS. 3 to 5 illustrate a method of modulation which permits a gain in sensitivity in accordance with the prior art.
Figure 4:
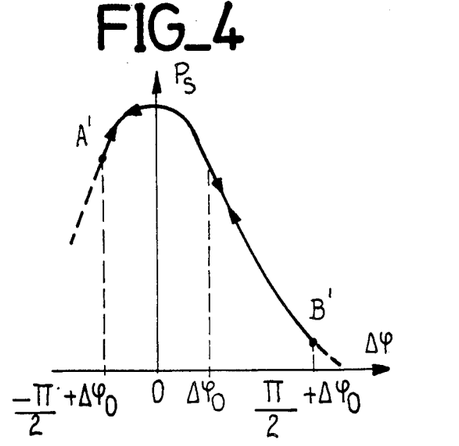

FIGS. 3 and 4 represent the effect of a phase modulation by a symmetrical function $\Phi(t)$. The operating point describes the curve $P_S = f(\Delta\phi)$ of FIG. 2 in symmetrical manner between a pair of end points.

The first pair A and B in FIG. 3 represents the case in which the rotation to be measured is zero and is reduced to the two values $-\pi/2$ and $+\pi/2$ radians. The second pair A' and B' in FIG. 4 represents the case in which the velocity to be measured is no longer zero and is expressed by a value $\Delta\phi_o$ of the phase difference; it is represented by the values:

$$(-\pi/2 + \Delta\phi_o) \text{ and } (+\pi/2 + \Delta\phi_o) \text{ radians.}$$

To this end, a reciprocal phase shift $\Phi(t)$ of rectangular shape can be applied at one end of the optical path with an amplitude of $(\pi/4)$ radians.

Taking the case of FIG. 3 as an example in which $\Omega = 0$ and $\Delta\phi_o = 0$ in the signal detected earlier, there will be added as a result of introduction of $\Phi(t)$ a component $\Phi(t) - \Phi(t-0)$. If $\Phi_{cw}$ and $\Phi_{ccw}$ are the phase shifts resulting from the two waves which will interfere as illustrated in the left-hand portion of FIG. 5, the phase shift between $\Phi_{cw}$ and $\Phi_{ccw}$ is in that case a purely reciprocal phase shift and $(\Phi_{ccw} - \Phi_{cw})$ is a rectangular wave signal which varies between $+\pi/4$ and $-\pi/4$ radians.

On the other hand, if consideration is given to the case of FIG. 4 in which $\Omega = \epsilon$ in the signal detected earlier, there will be added as a result of introduction of Φ(t) a component $(\Phi'_{ccw}-\Phi'_{cw})$ which is no longer centered with respect to zero. A nonreciprocal phase shift $\Delta\phi_o$ is in fact added to the previous reciprocal phase shift. In comparison with the preceding case in which $\Omega=o$, we have $$\Phi'(t)=\Phi(t)+\Delta\phi_o/2 \text{ and } \Phi'(t-\tau)='\Phi'(t)-\Delta\phi_o/2$$

thus $$\Phi'(t)-\Phi'(t\tau)=\Phi(t)-\Phi(t-\tau)+\Delta\phi_o$$

$\Phi_{cw}$ and $\Phi_{ccw}$ are the resultant phase shifts of each of the two waves which travel around the loop in opposite directions. $\Phi_{ccw}-\Phi_{cw}$ is therefore a rectangular-wave signal, the mean value of which is displaced by $\Delta\phi_o$ with respect to the time axis.

A few examples of construction of the modulator among other possible alternatives have already been described in the French patent cited earlier. This modulator is voltage-controlled by a signal $V_c$ generated by a control circuit CC (FIG. 1) at the frequency ($\frac{1}{2}t_o$). The detector D is of the synchronous type and receives a synchronization signal Sy having the same frequency.

When the rotational velocity is zero ($\Omega=o$), the detected optical intensity I is constant and equal to a quiescent-state value $I_o$ (FIG. 5) except for short pulses corresponding to the signal transitions ($\Phi_{ccw}-\Phi_{cw}$) since the rise and fall times are finite.

Figure 5:
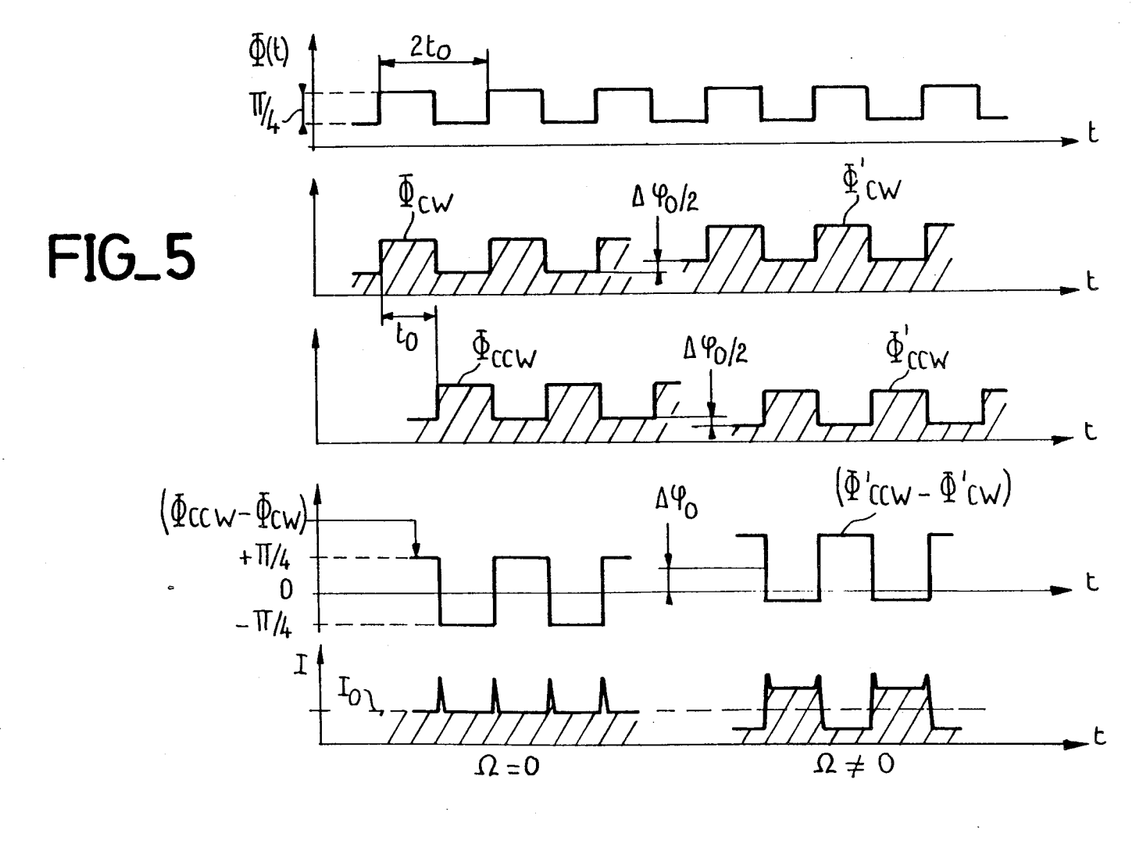

When the velocity is no longer zero, the optical intensity I is described by rectangular-wave signals having a mean value equal to the quiescent-state value $I_o$ which varies at the rate of the signals ($\Phi'_{ccw}-\Phi'_{cw}$).

As already mentioned in the foregoing, a "zero method" can be adopted instead of utilizing the signals directly.

With this objective, an additional phase-shift can be introduced as negative feedback with the phase shift $\Delta\phi_o$ produced by the nonreciprocal effect.

A suitable method consists in generating a so-called phase ramp, the slope of which is proportional to $(\Delta\phi_o/t_o)$.

Figure 6:
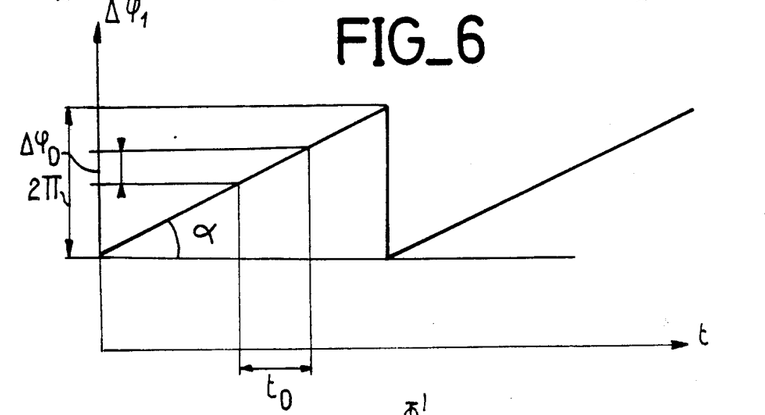
FIGS. 6 and 7 are diagrams illustrating particular aspects of the method in accordance with the invention.

In actual practice, it is only necessary to produce a phase shift of modulo $2\pi$ radians since the additional phase-shift signal cannot be increased indefinitely. To this end and as illustrated in FIG. 6, sawtooth signals are generated and have a phase $\Phi_1$, a slope $\alpha$ which is proportional to $(\Delta\phi_o/t_o)$ and a peak-to-peak amplitude equal to $2\pi$ radians.

The phase-modulation signal is combined with these sawtooth signals.

However, this analog method suffers from a disadvantage in that it fails to correlate the scale factors of the phase modulation control signals and of the negative-feedback signals. Furthermore, detection of the peak-to-peak amplitude of $2\pi$ radians must be performed with precision.

DESCRIPTION OF THE PREFERRED EMBODIMENTS OF THE INVENTION

The present invention makes it possible to circumvent the disadvantages outlined in the foregoing and to ensure automatic detection of the peak-to-peak amplitude of $2\pi$ radians.

Figure 7:
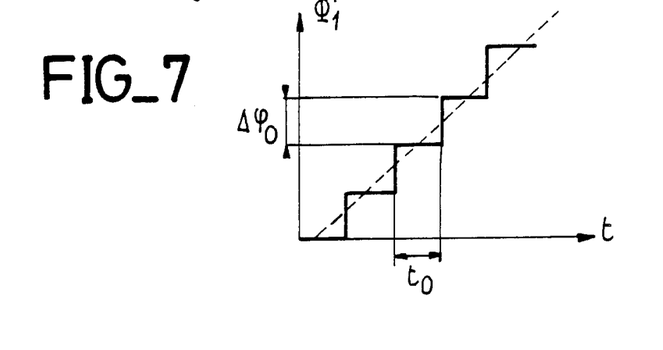

In accordance with a first distinctive and essential feature of the invention, the sawtooth negative-feedback phase-shift signal is replaced by a stair-step signal. The height of each "stair-step" is equal to $\Delta\phi_o$ and the time-duration is equal to $t_o$. FIG. 7 illustrates a signal of this type. It follows that, on an average, the equivalent slope of the stair-step "ramp" is equal to $(\Delta\phi_o/t_o)$.

Thus two waves displaced in the time interval of $t_o$ are always on two successive "stair-steps" and therefore experience two different phase shifts $\Delta\phi_o$. This technique has the advantage of being wholly compatible with a digital processing system.

Furthermore, summing of the signal modulation at the frequency ($\frac{1}{2}t_o$) and of the digital ramp can be performed directly by a processor for digital processing of the signal. This offers many advantages which will be developed in the following description.

The general construction of a device for processing the signal derived from detection of a non-reciprocal effect in accordance with the invention will now be described with reference to FIG. 8.

The synchronous detector D of FIG. 1 which is optically coupled to the exit path 3 essentially comprises a photodiode PD for converting the detected optical intensity to output electric signals VD. These signals are transmitted to synchronous detection circuits CDS and signals SY are applied to the synchronization input of each detection circuit at the frequency $\frac{1}{2} t_o$.

A central processor CPU manages the entire device. In a preferred alternative embodiment, said processor consists of a wired logic system. It is also possible to have a microprocessor associated with input-output interface elements for controlling various peripheral units.

Said processor CPU delivers the signals SY which can be the logic recopy of clock-pulse signals SH generated by an oscillator OSC such as, for example, a thermostatically-controlled quartz oscillator having a frequency ($\frac{1}{2} t_o$).

When the rate gyro is spinning, the entire response curve of the interferometer is relatively displaced as a function of the phase shift applied by the modulator. This gives rise to an intensity modulation at the frequency $f_o=(\frac{1}{2} t_o)$, the amplitude of which is proportional to the spin or rotational velocity if this latter is of sufficiently low value to ensure that the phase shift remains within the linear zone of the response curve.

The amplitude of this modulation is extracted by the synchronous detection circuits CDS and these latter produce output signals VDS which are transmitted to an interface element A such as, for example, an amplifier associated with an electric filter, normally of the PID type.

The output signal VA of this interface element A is then digitized by an analog-to-digital converter AD. The output signal VAD of said converter is transmitted to a circuit GSC which generates a composite control signal VSD. The design function of this circuit is to produce the digital stair-step ramp and to combine it with the digital phase-modulation signals in accordance with the principal aspect of the invention. These circuits comprise a digital integrator.

Said composite digital signal VSC is then again converted to an analog control voltage VC by a digital-to-analog converter DA.

The analog control voltage just mentioned is transmitted to the control input of the phase modulator Φ.

In addition to the synchronization signals SY of the synchronous detector D, the central processor CPU generates different control and synchronization signals designated by the references $VC_1$ to $VC_3$ and transmitted to the elements of the device in accordance with the invention which will hereinafter be described in detail.

By employing a digital integrator in the circuits GSC followed by the digital-to-analog converter DA, the problem of periodic relaxation of $2\pi$ radians is solved in a very simple manner. The dynamic range of the digital integrator is in fact limited by the number N of bits employed, with the result that the calculations produce only the low-weight N bits of the result. Moreover, if the converter DA is calibrated in such a manner as to ensure that the full-scale voltage (corresponding to a digital input of $2^N-1$) produces a phase shift of $2\pi$ radians, there is thus realized a system which automatically produces "modulo $2\pi$" phase shifts.

Relaxation of $2\pi$ radians is therefore achieved very simply and is automatically calibrated by the scale factor of the converter DA. In accordance with a noteworthy and advantageous aspect, the phase ramp itself, the biasing modulation which has the alternate values of $-\pi/2$ and $\pi/2$ radians, and the relaxation of $2\pi$ radians are generated digitally in all three cases and then converted to analog voltage by a single converter. The scale factors are therefore intrinsically identical, which considerably reduces the possibilities of error.

Figure 9:
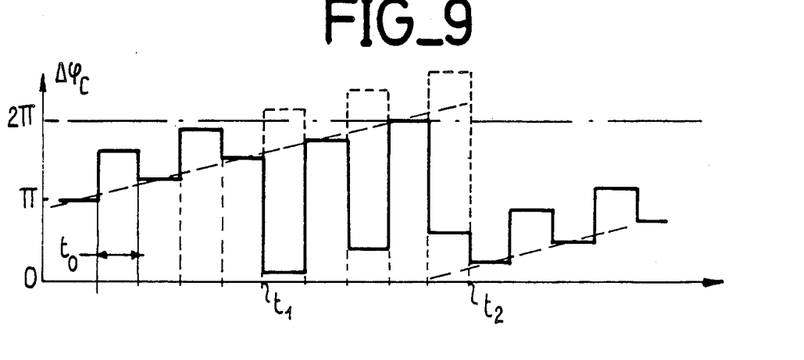
FIGS. 9 to 13 illustrate further aspects of operation of the device in accordance with the invention.

The phase variations corresponding to the signal VSD are represented on the diagram of FIG. 9 as a function of time. The origin of the time values is arbitrary.

The composite phase shift $\Delta\phi_C$ increases with the digital ramp having a phase $\Phi'_1$ (FIG. 7) on which positive increments ($+\pi/4$ radians) and negative increments ($-\pi/4$ radians) are superimposed from one period to the next (time interval $t_o$) in alternate sequence until the threshold value of $2\pi$ radians is reached, that is to say at the instant $t_1$ in the diagram. A value representing $2\pi$ radians is then subtracted. In the following period $t_1+t_o$ in FIG. 9, by reason of the fact that an increment equal to $-(\pi/4)$ radians is added algebraically, the composite signal is below the threshold of $2\pi$ radians. The process then begins again at the instant $t_1+2t_o$. The threshold of $2\pi$ radians is again overstepped. A value equal to $2\pi$ radians is once again subtracted. The process is repeated until the instant $t_2$ at which the amplitude of the digital phase ramp has exceeded $2\pi$ radians. This latter returns to zero and the cycle is resumed in the same manner as in the stage of operation prior to the instant $t_1$.

Figure 10:
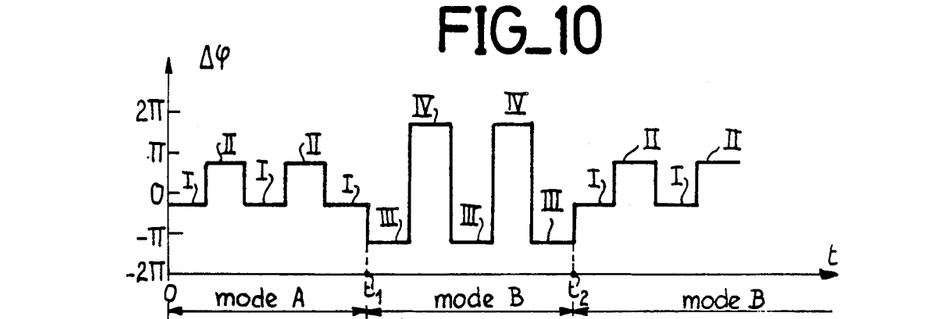

The progressive variation of phase shifts measured at the output of the interferometer is illustrated in the diagram of FIG. 10.

Figure 11:
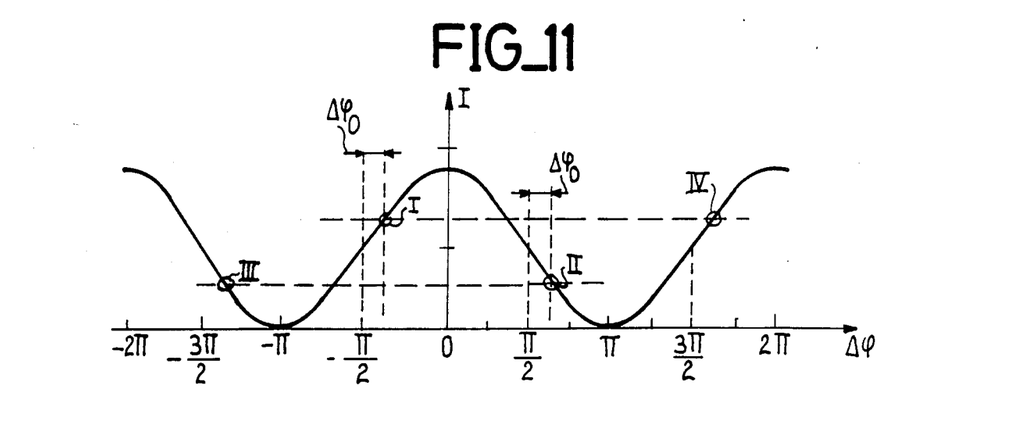

To sum up, as long as there is no overflow of the digital integrator, the phase difference between two clock periods is $\pm\pi/2+\Delta\phi_o$ ($\Delta\phi_o$ is the height of a stair-step of the digital ramp as shown in FIG. 7). The corresponding points I and II on the response curve of the interferometer are shown in FIG. 11. This figure represents the detected optical intensity I as a function of the time t.

On the other hand, when overflow takes place, the phase difference between two clock periods is $$\pm\frac{3\pi}{2}+\Delta\phi_o,$$

which corresponds to points III and IV in FIG. 11.

In both cases, the same response in intensity is obtained, which shows that this method of relaxation of $2\pi$ radians does not produce any modification in the detected signal.

There are therefore two modes of operation in one complete cycle: the first mode designated as "mode A" between the instants 0 and $t_1$ in the diagrams of FIGS. 9 and 10 and the second mode designated as "mode B" between the instants $t_1$ and $t_2$, depending on whether overflow of the digital integrator takes place or not.

However, according to a further advantageous embodiment of the invention, the arrangements adopted within the scope of the invention permit real-time corrections of the scale factor of the modulator. In the event of modification of the scale factor for any reason, it is in fact possible to detect this modification.

Figure 12:
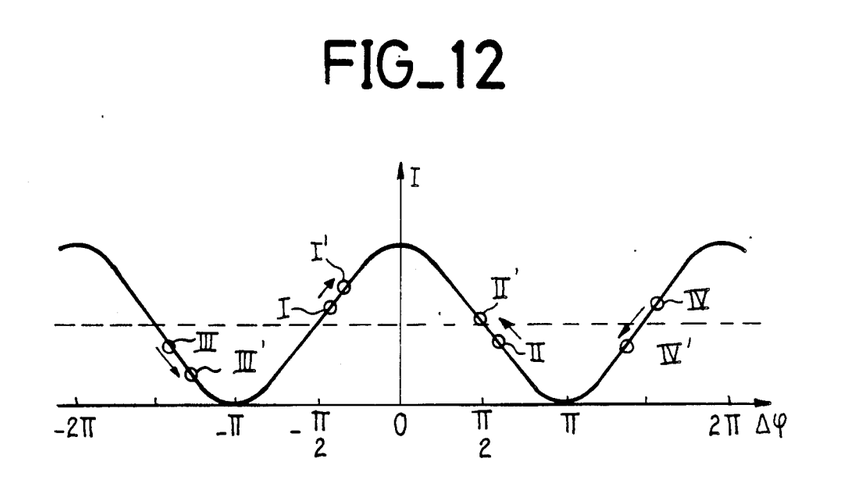

In order to illustrate this possibility, it will be supposed that the scale factor decreases, thus correlatively producing a phase modulation having an amplitude which is too small. This situation is illustrated in FIG. 12.

The points I to IV become I' to IV'. A general contraction of the dynamic range of phase modulation is observed in this case.

Figure 13:
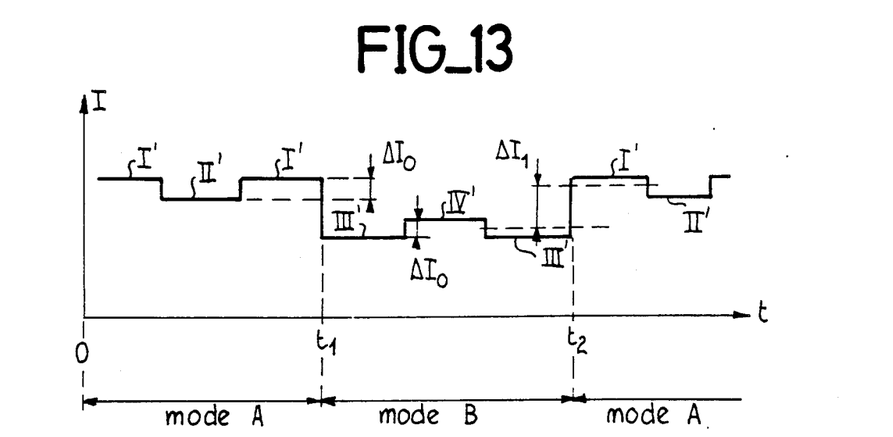

The diagram of FIG. 13 illustrates the detected variations in optical intensity.

If one remains in a linear zone, the differences in intensity $\Delta I_o$ on the one hand between points I' and IV' and on the other hand between points I and IV are unchanged. In contrast, the mean intensity at points 3 and 4 is lower than the mean intensity at points 1 and 2 (FIG. 11b).

The intensity jump $\Delta I_1$ observed at the time of transition from operating points I' and II'' ("mode A") to operating points III' and IV' ("mode B") is therefore a measurement of the error in the scale factor and thus makes it possible to correct this latter.

In point of fact, this measurement is carried out at each relaxation of $2\pi$ radians, that is to say more frequently as the rotational velocity is higher. Thus the relative accuracy of the scale factor increases with the rotational velocity, thus tending to ensure that absolute precision is uniformly achieved over the entire range of velocity.

Finally, in accordance with another advantage of the invention, the angular measurement provides above all, as a result of application of the negative-feedback signal, a measurement of position and not of velocity. In fact digital integration of velocity provides a measurement of position. If a pulse is generated at each relaxation of $2\pi$ radians, each of these pulses indicates an angular increment which satisfies the relation:

$$\alpha = \frac{\lambda n}{2R}$$

where n, $\lambda$ and R are respectively the equivalent refractive index of the mode of the fiber, the wavelength of the light employed and the mean radius of the optical fiber which forms the interferometer loop (shown in FIG. 1).

In a practical example of construction, the diameter of the loop was 5 centimeters, which corresponded to an angular increment of 5 arc-seconds in the case of the fiber and the laser source employed.

Figure 14:
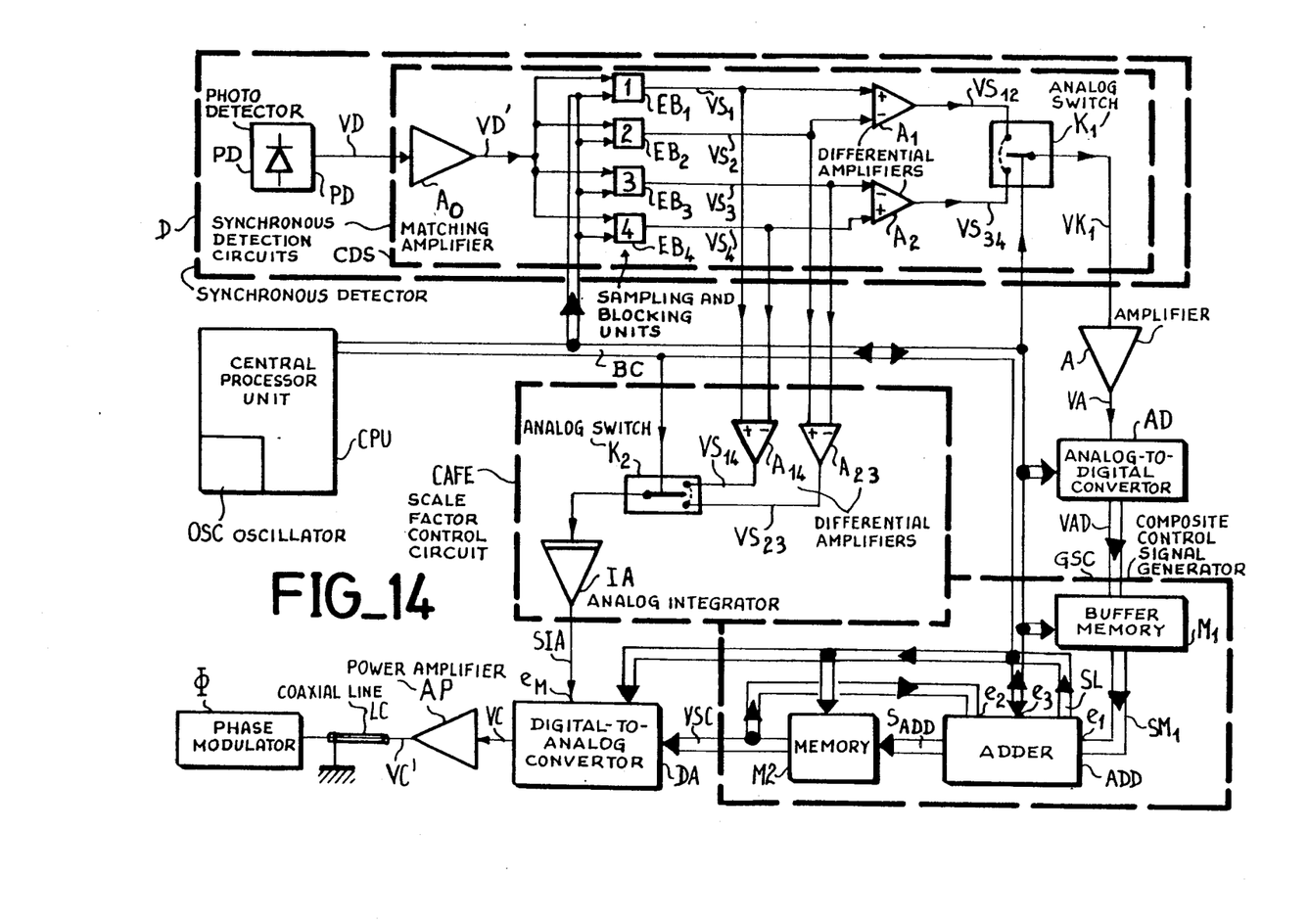
FIG. 14 is a detailed example of practical construction of a device in accordance with the invention.

A detailed example of construction of the different schematic blocks of the device shown in FIG. 8 will now be described with reference to FIG. 14. Furthermore, the device which is illustrated incorporates a circuit for control of the scale factor in accordance with the additional feature of the invention which has just been recalled.

Figure 8:
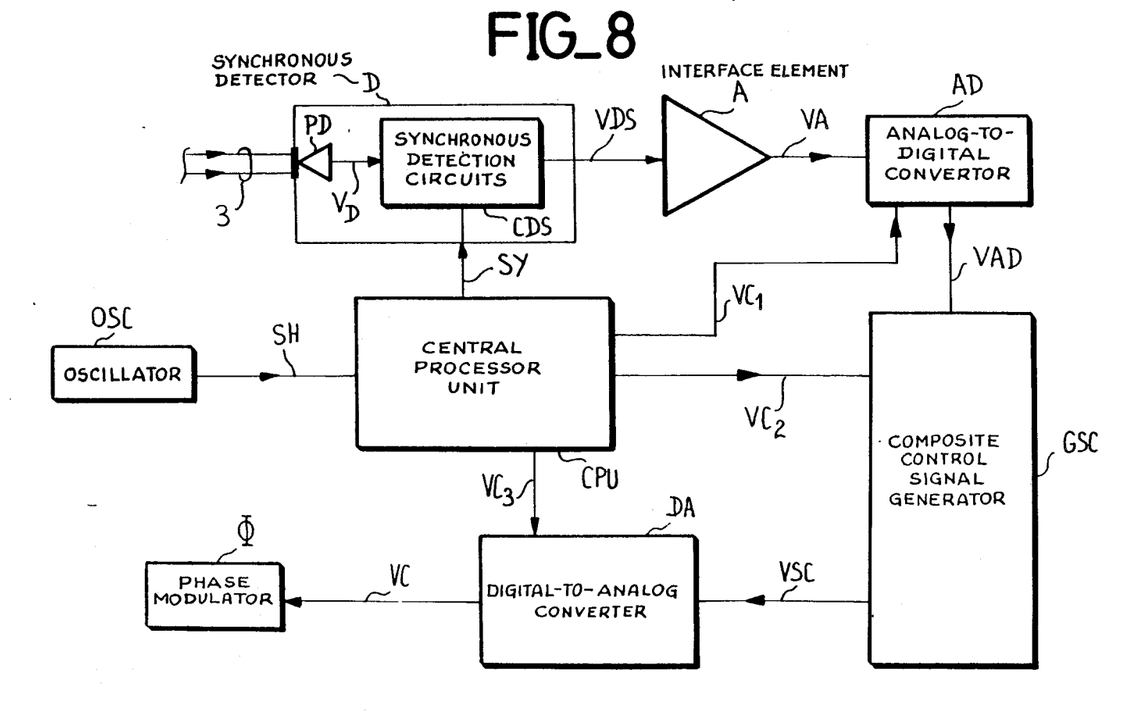
FIG. 8 is a schematic illustration of a device in accordance with the invention.

The elements which are common to those described with reference to FIG. 8 are designated by the same references.

The central processor CPU and the oscillator OSC for generating signals at the frequency $f_o = (\frac{1}{2} t_o)$ have been represented as a single block.

The processor CPU communicates with the other blocks by means of a bidirectional data-transmission multiconductor bus designated by the single reference BC.

The signals transported by said bus are digital signals comprising synchronization signals, control signals transmitted from the processor CPU to the different blocks and state signals representing the operation of certain circuits of these blocks and transmitted to the central processor CPU. These signals will be specified in the description which follows.

The first block is the detection block D comprising a photodiode PD which delivers square-wave signals VD at its output and at the frequency $f_o$, said signals being derived from the conversion of the collected light and the synchronous detection circuits CDS.

These detection circuits comprise an interface and matching amplifier $A_o$ which delivers at its output signals VD' which are logic copies of the signals VD.

These signals are transmitted to a signal input of four sampling and blocking units $EB_1$ to $EB_4$.

These units each have a permission input for receiving permission signals via the bus BC, these signals being produced by the processor CPU. Each of these signals corresponds to one of the states I to IV illustrated in FIGS. 10 and 11.

The output signals $VS_1$ to $VS_2$ of said sampling and blocking units represent the intensities detected during the periods corresponding to the four above-mentioned states (I to IV), that is to say the ordinates of the curve represented in FIG. 11, at points I to IV. The sampled values are then stored until the following sampling operation.

Sampling operations take place in accordance with the sequences shown in FIG. 10. In "mode A", the sequence is: I, II, etc ... The last value remains stored (I in FIG. 10) at the time of a change in mode (instant $t_1$) In "mode B", the sequence is: III, IV, etc ..., up to the instant $t_2$. The cycle then begins again at "mode A".

In order to obtain a value which is representative of the phase shifts, it is necessary to generate a signal representing the difference between states I and II in the case of "mode A" and states III and IV in the case of "mode B". To this end, two differential amplifiers $A_1$ and $A_2$ are employed.

The output signals $VS_1$ and $VS_2$ are transmitted to a first amplifier $A_1$, the output signal $VS_{12}$ of which represents the amplified difference signal between states I and II. The same applies to states III and IV. Thus the signals $VS_3$ and $VS_4$ are transmitted to a second amplifier $A_2$ which delivers at the output an amplified difference signal $VS_{34}$.

Finally, an analog switch $K_1$ selects one of the two signals $VS_{12}$ or $VS_{34}$, depending on whether the operating sequence is in "mode A" or in "mode B" respectively. To this end, a mode-selecting signal which is also produced by the central processor is transmitted via the bus BC to a control input of the switch shown in the figure in the form of an electromechanical component for reasons of simplification. In actual fact, this switch is an integrated electronic semiconductor component. Components of this type are commonly available commercially and the choice is governed in particular by the type of technology adopted for the other components.

The output signal $VK_1$ is transmitted to the amplifier A which comprises an electric filter. This filter is preferably of the so-called PID type (proportional-integral-derivative) whose transfer function depends on the characteristics which are sought for velocity control and which depend essentially on the selected frequency $f_o$, the stability of the system as a whole being ensured by said filter. This arrangement is no different from the prior art and calls for no extended description.

In a manner which is more specific to the invention, the device then comprises three units in cascade: an analog-to-digital converter AD, the circuits GSC and a digital-to-analog converter DA.

The converter AD receives synchronization and control signals via the buy BC in order to effect conversions of the output signal VA of the amplifier A at the same rate as the frequency $f_o$ and delivers at its output signed digital signals VAD, that is to say signals having a binary value which is proportional to the velocity and the sign of which represents the direction of rotation.

The circuits GSC for generating the composite signal VSC comprise a first buffer memory $M_1$ for storing the digital signal VAD. In accordance with conventional practice, said memory receives via the control bus BC a loading signal for storing the signal VAD at the same rate as the conversions.

The stored signals $SM_1$ which are available at the output of the memory are transmitted to one of the computation inputs $e_1$ of an adder AD.

In a particular example of construction, the adder AD is made up of four-bit adding circuits of a type in common use and of a logic for converting a number consisting of eight signed bits to a number consisting of twelve unsigned bits. All other solutions and/or word lengths can naturally be contemplated.

A second memory $M_2$ which operates as an accumulator register is disposed in cascade and receives the output signals SADD of the adder ADD. The signals VSC stored in this memory $M_2$ and available at the output are fed back to a second computation input $e_2$ of the adder ADD and added to the digitized value of the rotational velocity.

A digital integration is thus achieved by incrementing the output value by a quantity equal to the instantaneous rotational velocity with a period $2t_o$.

The output signal SADD of said adder ADD is therefore representative of the angular position of the rate gyro. The overflow is representative of an angular displacement of predetermined amplitude; in the particular example of construction, the angular displacement is equal to 5 arc-seconds as indicated earlier. Overflow takes place each time the capacity of the adder is exceeded, namely in respect of a binary value higher than $2^N - 1$ (positive overflow) or lower than zero (negative overflow), where N is the number of bits of the word processed by the adder.

It is at this level that the square-wave phase modulation signal is incorporated at the frequency $f_o$.

This is performed by adding algebraically a binary value representing alternately the values $+\pi/4$ and $-\pi/4$ radians, namely 0 001 000 000 and 1 001 000 000 under the conditions of choice of components described earlier. These binary words are treated by the processor CPU and transmitted via the bus BC to a third input $e_3$ of the adder.

The overflow state is transmitted by an output SL via the bus BC to the central processor CPU. Starting from these signals and from the clock signals and by utilizing logic functions of the AND type, said central processor produces the different control and synchronization signals which are transmitted to the different units and serve to discriminate the "A modes" from the "B modes" and, within these modes, on the one hard states I and II and on the other hand states III and IV.

As has already been recalled, an advantageous additional alternative embodiment of the invention provides a circuit for controlling the scale factor CAFE which has not been shown in FIG. 8.

Referring again to FIGS. 12 and 13, it has been indicated that the differences in amplitude between states I' and IV' on the one hand and states II' and III' on the other hand are representative of the error in the scale factor at the time of transition of $2\pi$ radians.

The measurement of these states is represented by the amplitude of the output signals $VS_1$ to $VS_4$ of the sampling and blocking circuits $EB_1$ to $EB_4$.

In order to establish the differences mentioned above, provision is made in the scale-factor control circuits for two differential amplifiers $A_{14}$ and $A_{23}$ which receive at their inputs respectively the signals $VS_1$ and $VS_4$ and the signals $VS_2$ and $VS_3$.

The output signals $VS_{14}$ and $VS_{23}$ represent said differences after amplification.

An analog switch $K_2$ of the same type as the switch $K_1$ and also controlled by a signal indicating "mode A" or "mode B" selectively transmits one of these signals to an analog integator IA.

Should it be desired to incorporate these arrangements in the device in accordance with the invention, the digital-to-analog converter DA not only performs the conversion buy also multiplies the analog signal derived from the conversion by a value which is representative of the scale factor. To this end, the converter has a multiplication input $e_M$ which receives the output signal SIA of the analog integrator.

The conversions are naturally synchronized at the same rate as the frequency $f_o$ by signals transmitted via the bus BC.

The device is completed by a power amplifier AP to which is transmitted the control signal VC derived from the digital-to-analog conversion. The output signal VC' is transmitted by a matches coaxial line LC to the control input of the phase modulator $\Phi$ which is placed within the loop. The arrangements just mentioned and considered alone do not differ from the prior art in any respect.

The control loop is thus closed and the phase modulator $\Phi$ imparts a composite phase modulation to the countercirculating light waves at the combined rates of the frequency $f_o$ and of the relaxations of the digital phase ramp. This reciprocal phase modulation will be combined with the nonreciprocal effects which are proportional to the rotational velocity.

To sum up and to help fix ideas under the conditions of choice of the components mentioned in the foregoing, the degree of accuracy which can be achieved in regard to the scale factor is typically $10^{-4}$. Position information is delivered is the form of two pulse trains representing positive or negative angular increments of 5 arc-seconds per pulse.

More especially in the case of the aforementioned choice of an 8-bit analog-to-digital converter and digital integration on 12 bits, the dynamic range of velocity is limited by the number of bits employed. Thus the maximum velocity produces a phase shift of $(\pi/8)$ radians since the velocity is measured on eight bits whereas the full scale on twelve bits has the value of $2\pi$ radians. This value corresponds to a maximum rotation of $\pm 23$ degrees per second. In order to extend the dynamic range, it is only necessary to increase the number of bits of the binary word delivered by the converter AD, thereby increasing the dynamic range to a corresponding extent. This is possible, however, only insofar as the phase shift remains smaller than $2\pi$ radians. This condition corresponds to rotational velocities of the order of 350 degrees per second.

It is also possible to extend the dynamic range by producing a relative displacement of the eight bits of the velocity measurement. The high-weight bits are added and a corresponding number of low-weight bits are suppressed. The total number of bits is thus retained for the velocity. It is then necessary to reduce the number of bits of the position by an equal quantity.

It is naturally possible to measure higher velocities. In order to do so, it is only necessary to reduce the length of optical fiber which forms the closed loop. This has the effect of increasing the modulation frequency and producing smaller optical phase shifts in respect of a predetermined rotational velocity.

With a view to increasing the dynamic range, it is also possible to increase the modulation frequency by multiplying it by an odd whole number $2N+1$. The maximum achievable increment is also multiplied by $2N+1$.

There remains a problem related to the fact that the signals are subjected to digital processing or in other words are quantized. In the case of very low rotational velocities, the velocity measurement should be zero if the signals are below the quantization level. However, the solution lies in the advantageous use of the optical noise.

In fact, if synchronous detection is employed over a broad band extending typically to values above 100 KHz, and taking into account the power employed which is typically of the order of 0.5 W, the ratio of noise amplitude to quantization threshold is of the order of 2. The characteristics of the filter associated with the amplifier A must take these conditions into account.

The sensitivity is increased artificially by virtue of the noise measurement and of the mean value of said measurement as established by digital integration. In extreme cases, it may prove necessary to add to the signal a noise having known characteristics.

Furthermore, by making use of the same phenomenon, it is also possible to reduce the accuracy of the analog-to-digital converter to an arbitrarily small number of bits compatible with the noise amplitude of the chain of closed-loop elements and with the desired dynamic range.

An extreme limiting value is conversion on a single bit. In this case, and in accordance with an alternative embodiment which has not been illustrated, the analog-to-digital converter can be reduced to comparators having the function of delivering output signals which are of the "all-or-none" type, depending on whether a pre-established threshold value has been overstepped or not.

The device in accordance with the invention therefore permits highly accurate and sensitive measurement of rotation while not calling for the use of elements having very precise dimensional tolerances, thus permitting low-cost production. Furthermore, by virtue of the fact that the rotation is represented by a double sequence of pulses, processing of signals of this type is readily performed by means of computation elements of the digital type, for example by means of the processor CPU which is also employed for delivering the different control and synchronization signals described earlier.

However, the present invention is not limited solely to the alternative forms of construction which have been described in the foregoing with a view to providing a more complete explanatory illustration of the invention.

By way of non-limitative example, the frequency of the square-wave modulating signals can be higher than the frequency ($1/t_o$) of transitions of the "stair-steps" of the digital ramp (shows in FIG. 7). In more precise terms, the frequency of the square-wave modulation signals complies with the relation: m ($1/t_o$), where m is an odd whole number which is higher than or equal to unity.

What is claimed is:

1. An interferometric device for measuring a nonreciprocal phase shift experienced by two light waves circulating in opposite directions within a closed-loop waveguide, said device comprising a monochromatic light source, photodetecting means for detecting the interference of said two waves and delivering an output electric signal which is representative of the light intensity of the detected interference and optical beam-splitting and mixing means for optically coupling the ends of said waveguide to said light source and to said photodetecting means, electrically controlled optical phase-shifting means placed within the closed loop which produces action on said waves, an oscillator for delivering periodic electric signals in the form of square-wave pulses having a frequency $f_o = \frac{1}{2} t_o$, where $t_o$ is the time taken by each wave to travel along the optical path defined by the closed loop, synchronous detection circuits for receiving the output signal of the photodetector on a first input and a detection synchronization signal derived from said electric signals of frequency $f_o$ on a second input, an analog-to-digital converter which is connected to the output of the synchronous detection circuits and converts the electric signals derived from the synchronous detection to a signed binary word of predetermined length, circuits for generating a composite digital control signal and a digital-to-analog converter for converting said composite digital control signal to an analog control signal which is transmitted to a control input of said optical phase-shift means, and means for control and synchronization of the synchronous detection circuits, of the analog-to-digital converter, of the circuits for generating the composite digital control signal and of the digital-to-analog converter, the function of said circuits for generating said composite digital control signal being to produce a signal derived from the superposition of a first square-wave periodic signal at said frequency $f_o$, such that after digital-to-analog conversion, said first signal imparts a periodic reciprocal-effect phase shift alternately of $+\pi/2$ and $-\pi/2$ radians to said two waves which circulate in opposite directions in the closed loop, and of a second signal in stair-steps in which each stair-step has a duration equal to said time interval $t_o$ or to an odd integral multiple of said time interval and an amplitude such that, after analog-to-digital conversion, said second signal imparts additional reciprocal-effect incremental phase shifts having an amplitude proportional to the amplitude of said non-reciprocal phase shift and of opposite sign, the phase shift imparted by the second signal being such as to produce a relaxation having an amplitude of $2\pi$ radians, thereby ensuring that said superposition of the first and second signals forming the composite control signal imparts to the waves circulating in opposite directions within the closed loop total phase shifts between said two waves which vary alternately between $-\pi/2$ and $+\pi/2$ radians during the first periods and $-3\pi/2$ and $+3\pi/2$ radians during the second periods, said first and second periods being such as to occur successively in an overlapping sequence.

2. A device according to claim 1, wherein the control and synchronization means are constituted by a wired-logic signal processor.

3. A device according to claim 1, wherein the synchronous detection circuits comprises:

a first pair of sampling and blocking circuits for storing the maximum amplitude of an electric signal derived from collection and photoelectric conversion by the photodetecting means of the optical intensity of interference of the waves which circulate in opposite directions during said first periods, the function of a first sampling and blocking circuit being to store the maximum amplitude when the total phase shift between said waves is $-\pi/2$ radians and the function of the second sampling and blocking circuit being to store said amplitude when the total phase shift between said waves is $+\pi/2$ radians;

a second pair of sampling and blocking circuits for storing the maximum amplitude of the same electric signal during said second periods, the function of a third sampling and blocking circuit being to store the maximum amplitude when the total phase shift between the waves is $-3\pi/2$ radians and the function of a fourth sampling and blocking circuit being to store said amplitude when said phase shift is $+3\pi/2$ radians;

first and second differential amplifiers for forming the difference between the maximum amplitudes stored in the first and second sampling and blocking circuits and the third and fourth sampling and blocking circuits; and an analog switch for connecting the output of the synchronous detection circuits alternately to the outputs of the first and second amplifiers respectively during said first and second periods.

4. A device according to claim 3 wherein, the amplitude of the phase shifts between the waves which circulate in opposite directions within the closed loop and the amplitude of said analog control signal being related by a scale factor, said phase shifts being imparted by the electrically controlled optical phase-shift means, said device being further provided with a circuit for controlling said scale factor, said control circuit comprising third and fourth differential amplifiers for forming the difference between the stored signals respectively within said first and fourth sampling and blocking circuits and within the second and third sampling and blocking circuits, a second analog switch actuated at each transition between said first and second periods so as to transmit at it output at the same rate as the transitions and in alternate sequence the signals which are present on the outputs of the third and differential amplifiers, and an analog integrator, and wherein said digital-to-analog converter is combined with an analog multiplier so as to multiply the amplitude of the signal derived from conversion by the signal delivered by said analog integrator.

5. A device according to claim 1, wherein the circuits for generating said composite digital control signal comprises:

first storage means for receiving on one storage input signals derived from the analog-to-digital conversion;

a three-input adder having first and second outputs for receiving on the first input the signals stored by the first storage means, the third input being intended to receive digital signals and to assume first and second values at the same rate as the frequency $f_o$ representing, after digital-to-analog conversion, signals for controlling the phase shift between the waves which circulate in oposite directions within the closed loop respectively for the purpose of imparting phase shifts of $-\pi/2$ and $+\pi/2$ radians;

second storage means being intended to receive on one storage input the signals delivered at a first output of the adder, the signals stored by said second storage means being transmitted to the second input of said adder by feedback, the adder and the second storage means being so designed as to form a digital integrator in which the overflows transmitted by the second output of said adder to said control means are representative of a nonreciprocal phase shift of pre-determined amplitude.

* * * * *